(12) United States Patent
Sato (10) Patent No.: US 11,485,087 B2
(45) Date of Patent: Nov. 1, 2022

(54) DATA PROCESSING APPARATUS AND STORAGE MEDIUM

(71) Applicant: CANON KABUSHIKI KAISHA, Tokyo (JP)

(72) Inventor: Shigehiko Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 16/283,493

(22) Filed: Feb. 22, 2019

(65) Prior Publication Data

US 2019/0184645 A1 Jun. 20, 2019

Related U.S. Application Data

(63) Continuation of application No. PCT/JP2017/030777, filed on Aug. 28, 2017.

(30) Foreign Application Priority Data

Aug. 31, 2016 (JP) .............................. JP2016-169615
Aug. 31, 2016 (JP) .............................. JP2016-169616

(51) Int. Cl.
*B29C 64/386* (2017.01)
*B33Y 50/00* (2015.01)
*G06F 30/00* (2020.01)

(52) U.S. Cl.
CPC ............ *B29C 64/386* (2017.08); *B33Y 50/00* (2014.12); *G06F 30/00* (2020.01)

(58) Field of Classification Search
CPC ..... B29C 64/386; B29C 64/393; G06F 30/00; G06F 30/10; G06F 30/12; G06F 30/17; G06F 2111/00–2119/22; B33Y 50/00; B33Y 50/02; B33Y 70/00; B33Y 80/00; B33Y 99/00
USPC ............................................................ 703/1
See application file for complete search history.

(56) References Cited

U.S. PATENT DOCUMENTS

| 10,299,722 | B1* | 5/2019 | Tran .................... A43B 3/0005 |
| 10,317,880 | B2* | 6/2019 | Tanaka .................. B33Y 50/00 |
| 2008/0082944 | A1* | 4/2008 | Yamaguchi ........... G06F 30/394 716/137 |
| 2009/0142436 | A1* | 6/2009 | Kuzusako .............. B33Y 30/00 425/174.4 |

(Continued)

FOREIGN PATENT DOCUMENTS

| JP | 2015-174426 A | 10/2015 |
| JP | 2016-104550 A | 6/2016 |
| WO | 2015/159598 A1 | 10/2015 |

*Primary Examiner* — John W Miller
*Assistant Examiner* — Sean N. Haiem
(74) *Attorney, Agent, or Firm* — Canon U.S.A., Inc., IP Division (57) ABSTRACT

A data processing apparatus includes means configured to obtain shaping data including a plurality of shaping models, means configured to obtain a predetermined condition, shaping model extraction means configured to extract a shaping model group including a plurality of shaping models which satisfy the predetermined condition from among the plurality of shaping models, and processing means configured to add shaping data of an additive model which associates a plurality of shaping models included in the shaping model group to each other to shaping data of the plurality of shaping models included in the shaping model group.

16 Claims, 7 Drawing Sheets

(56) References Cited

U.S. PATENT DOCUMENTS

| | | | | |
|---|---|---|---|---|
| 2010/0168890 A1* | 7/2010 | Fisher | ............ | B33Y 30/00 |
| | | | | 700/98 |
| 2011/0016446 A1* | 1/2011 | Krebs | ............ | H05K 3/0005 |
| | | | | 716/137 |
| 2014/0149095 A1* | 5/2014 | Davison | ............ | A61B 17/152 |
| | | | | 703/7 |
| 2015/0328004 A1* | 11/2015 | Mafhouz | ............ | A61F 2/34 |
| | | | | 700/98 |
| 2016/0151981 A1* | 6/2016 | Nomura | ............ | H04N 1/32144 |
| | | | | 700/98 |
| 2016/0185049 A1* | 6/2016 | Tanaka | ............ | G05B 19/4099 |
| | | | | 700/98 |
| 2016/0236417 A1* | 8/2016 | Rothenberg | ............ | B33Y 50/00 |
| 2017/0001371 A1* | 1/2017 | Sobue | ............ | B29C 64/141 |
| 2017/0072639 A1* | 3/2017 | Levine | ............ | G05B 19/4099 |
| 2017/0182710 A1* | 6/2017 | Haga | ............ | B33Y 30/00 |
| 2018/0049838 A1* | 2/2018 | Mitani | ............ | A61B 90/08 |

\* cited by examiner

| GROUP No. | GROUP NAME | MEMBERS OF SHAPING MODEL | SHAPE | WIDTH/ THICKNESS | MATERIAL | COLOR |
|---|---|---|---|---|---|---|
| 1 | TEST A | COMPONENT 1 COMPONENT 2 | BAR | 5 mm | STRUCTURAL MATERIAL | WHITE |
| 2 | TEST B | COMPONENT 3 COMPONENT 4 | TRAY | 7 mm | SUPPORT MEMBER | BLUE |

DATA PROCESSING APPARATUS AND STORAGE MEDIUM

CROSS-REFERENCE TO RELATED APPLICATIONS

This application is a Continuation of International Patent Application No. PCT/JP2017/030777, filed Aug. 28, 2017, which claims the benefit of Japanese Patent Application No. 2016-169616, filed Aug. 31, 2016 and No. 2016-169615, filed Aug. 31, 2016, all of which are hereby incorporated by reference herein in their entirety.

TECHNICAL FIELD

The present invention relates to a data processing apparatus, a shaping apparatus, a data processing method, a program, a storage medium, and a method for fabricating a solid object.

BACKGROUND ART

A laminate shaping method for forming a solid object by laminating a large number of layers has attracted attention. The laminate shaping method is also referred to as additive manufacturing (AM), 3D printing, rapid prototyping, or the like.

Solid objects shaped by the laminate shaping method are individually managed by a worker, and it is difficult to check and manage fabricated individuals depending on quality of material or a shape of the solid objects. Therefore, facilitation of identification of a solid object shaped by the laminate shaping method is demanded.

As a method for identifying a solid object, a method for assigning a pattern which enables identification of a solid object to the solid object is used, such as a method for imprinting a mark on each solid object. According to PTL 1, a method for fabricating a solid object to which a pattern including information which is readable under a predetermined condition is assigned is proposed. In a technique disclosed in PTL 1, a latent image (a pattern for identification) is assigned to a solid object to be shaped using ink for generation of latent images. The latent image may be visually recognized when the solid object shaped as described above is observed under the predetermined condition, and therefore, the solid object may be identified. Furthermore, PTL 2 discloses formation of an information code for identifying a shaped object in an inside or on a surface of the shaped object.

CITATION LIST

Patent Literature

PTL 1 Japanese Patent Laid-Open No. 2015-174426
PTL 2 International Publication No. 15/159598

Use of the laminate shaping method enables shaping of a plurality of shaping models by one shaping process. Therefore, the laminate shaping method may be employed in a case where shaping models which are requested to be shaped by different clients are collectively shaped by one shaping process. In this case, a process of extracting a solid object which satisfies a predetermined condition, such as a condition in which the same client is requested, from a plurality of solid objects shaped by one shaping process is required to be performed after the shaping. Here, in the techniques of identifying information of solid objects disclosed in PTL 1 and PTL 2, a worker is required to check the individual information of the solid objects and determine whether the predetermined condition has been satisfied before the extraction, and therefore, a complicated process is required.

Accordingly, the present invention is provided to improve efficiency of extraction of a plurality of solid objects which satisfy a predetermined condition from a plurality of shaped solid objects.

SUMMARY OF INVENTION

According to an aspect of the present invention, a data processing apparatus includes means configured to obtain shaping data including a plurality of shaping models, means configured to obtain a predetermined condition, shaping model extraction means configured to extract a shaping model group including a plurality of shaping models which satisfy the predetermined condition from among the plurality of shaping models, and processing means configured to add shaping data of an additive model which associates a plurality of shaping models included in the shaping model group to each other to shaping data of the plurality of shaping models included in the shaping model group.

Further features of the present invention will become apparent from the following description of exemplary embodiments with reference to the attached drawings.

DESCRIPTION OF EMBODIMENTS

Terms to be used in the present invention will be defined before the present invention is described.

A term "shaping target object" indicates a solid object to be shaped. A material used in a structure of the shaping target object is referred to as a "structural material" and a portion formed by the structural material which is included in a shaping object which is being shaped is referred to as a "structural portion". Furthermore, a member which supports a structural portion so as to assist shaping, such as an intrusion portion (an overhung portion) or a narrow portion of a shaping target object, is referred to as a "support body", and a material used for shaping of the support body is referred to as a "support material". Furthermore, the "structural material" and the "support material" are correctively referred to as a "shaping material". The support material may be the same as the structural material or different from the structural material so that the support body is selectively removed with ease.

Data associated with a three-dimensional shape of a shaping target object is referred to as a "shaping model". The shaping model may include information on color and information on a shaping material to be used in a structure of a shaping target object. Although the data associated with a three-dimensional shape indicates data of a stereolithography (STL) format, for example, the format is not particularly limited as long as the data is associated with a three-dimensional shape. Furthermore, data associated with a three-dimensional shape including at least one "shaping model" is referred to as "shaping data". Specifically, in a case where a plurality of objects are included in the "shaping data", the individual objects correspond to "shaping models". Then a group of shaping instruction information of the shaping target object and data including the "shaping data" is referred to as a "shaping job". Specifically, the shaping job includes at least one shaping model.

Next, an embodiment of the present invention will be described with reference to the accompanying drawings. However, the present invention is not limited to the embodiment described below. Furthermore, changes and modifications of the embodiment described below based on the general knowledge of those who skilled in the art without departing from the scope of the present invention are also included in the present invention.

Figure 1:
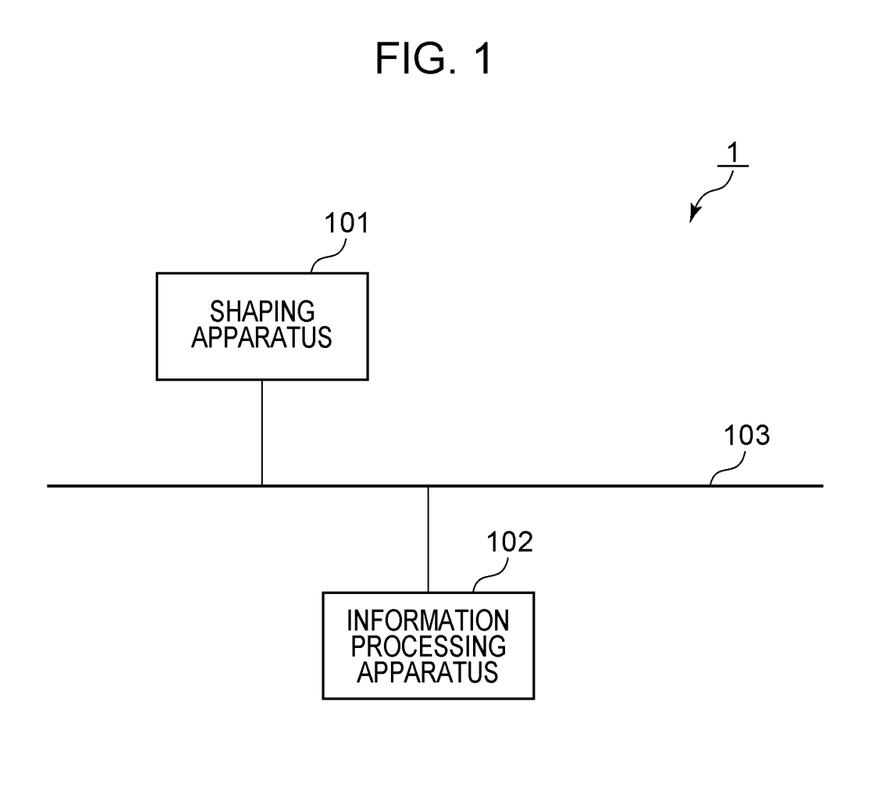
FIG. 1 is a diagram schematically illustrating an entire shaping system including a shaping apparatus according to an embodiment.

FIG. 1 is a diagram schematically illustrating an entire shaping system including a shaping apparatus according to this embodiment. A shaping system 1 according to this embodiment includes a shaping apparatus 101 and an information processing apparatus 102.

The shaping apparatus 101 receives an input of a shaping job and fabricates an object to be shaped in accordance with shaping instruction information and a shaping model included in the shaping job. In the fabrication of an object to be shaped, at least a structural material is used and a support material is used where appropriate. The shaping apparatus 101 fabricates a shaped object (a solid object) by successively laminating a number of material layers (thin films) by the laminate shaping method. The apparatus is also referred to as an additive manufacturing (AM) apparatus, a 3D printer, or a rapid prototyping (RP) apparatus.

The shaping job is transmitted from the information processing apparatus 102 to the shaping apparatus 101 through a communication path 103. Any means may be employed as the communication path 103 as long as data may be transmitted and received between a plurality of apparatuses, such as a local area network (LAN), a universal serial bus (USB), and the Internet.

The information processing apparatus 102 which is a personal computer or a tablet device, for example, includes a data processing mechanism capable of transmitting data to an outside.

Configuration of Shaping Apparatus

Figure 2:
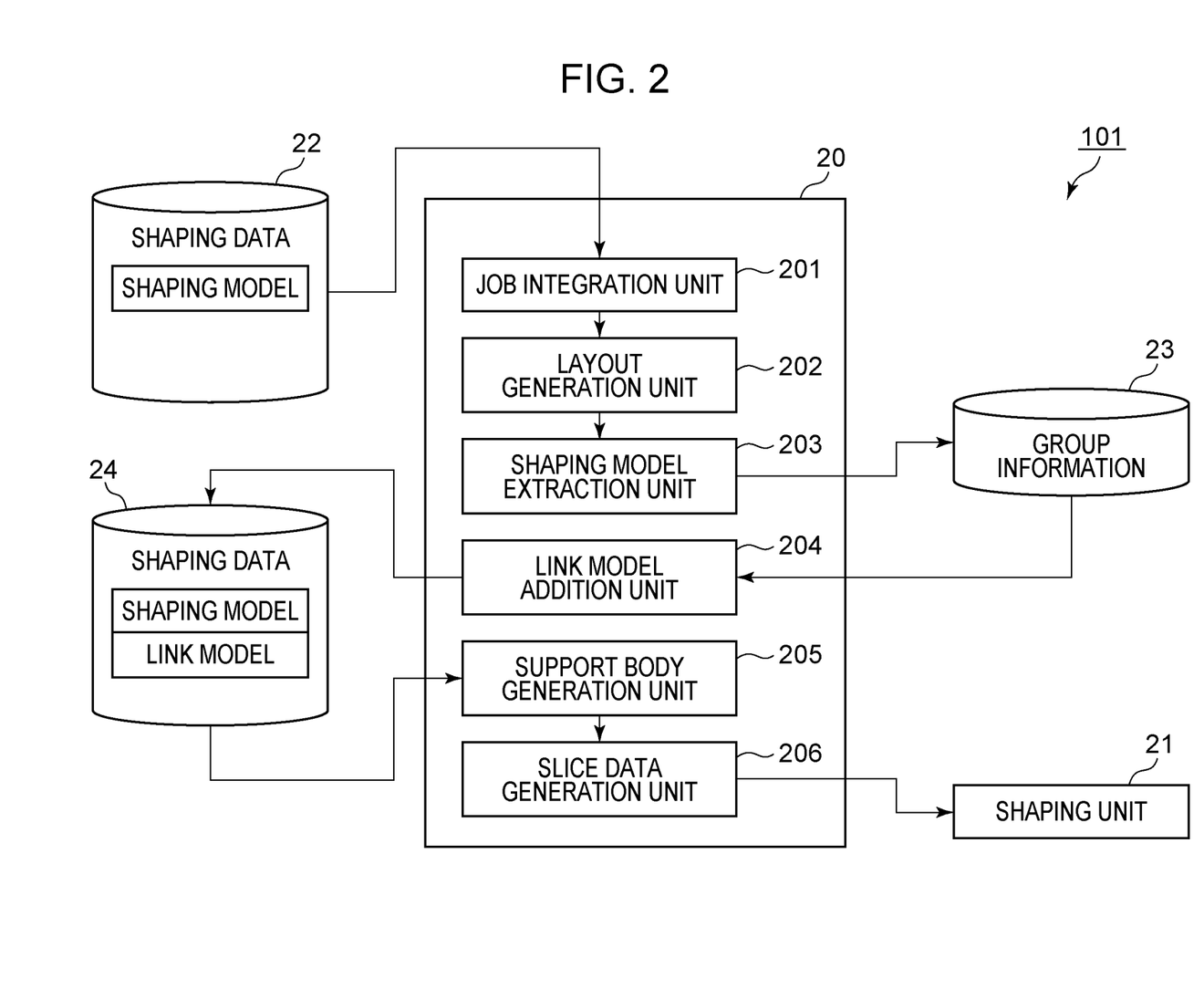
FIG. 2 is a diagram schematically illustrating a configuration of the shaping apparatus according to the embodiment.

The shaping apparatus 101 including a read only memory (ROM) or a random access memory (RAM) executes a shaping program stored in the ROM in advance and performs data processing and device control. FIG. 2 is a diagram schematically illustrating a processing section associated with addition of a link model in a process performed by the shaping program which is a part of a software configuration included in the shaping apparatus 101. Note that it is not necessarily the case that the entire shaping program is executed by the shaping apparatus 101, and a portion of the shaping program or the entire shaping program may be executed by a portion other than the shaping apparatus 101 in the shaping system 1.

FIG. 2 is a diagram schematically illustrating a configuration of the shaping apparatus 101 according to the embodiment. As described above, functions of units included in a processing unit 20 included in the shaping apparatus 101 may be realized when a calculation unit, such as a central processing unit (CPU), included in the shaping apparatus 101 executes a shaping program stored in the ROM of the shaping apparatus 101 in advance.

The processing unit 20 has a function of obtaining a shaping job including shaping data through the communication path 103. Specifically, the processing unit 20 includes a shaping data obtaining unit (not illustrated).

A job integration unit 201 integrates a plurality of shaping jobs obtained by the shaping apparatus 101 through the communication path 103 so as to generate a single shaping job. Here, the job integration unit 201 integrates shaping data included in the individual shaping jobs so as to generate integrated shaping data. It is assumed here that the job integration unit 201 integrates first shaping data including a first shaping model group including at least one shaping model and second shaping data including a second shaping model group including at least one shaping model. In this case, the generated integrated shaping data includes the first shaping model group and the second shaping model group.

A layout generation unit 202 edits layout of the shaping models included in the shaping data included in the shaping jobs. The layout generation unit 202 edits the layout by adjusting directions and arrangements of the shaping models. The layout generation unit 202 may edit the layout such that a period of time required for a shaping process performed by a shaping unit 21 is reduced or may edit the layout such that the number of support members to be used is reduced.

Furthermore, the layout generation unit 202 may generate layout after a shaping model extraction unit 203 described below selects a plurality of shaping models which satisfy a predetermined condition for each condition to be extracted and performs grouping on the plurality of shaping models. In this case, the layout generation unit 202 preferably generates layout such that distances between the plurality of shaping models which have been categorized into the same group by the shaping model extraction unit 203 are small. Specifically, the layout generation unit 202 preferably generates layout such that the plurality of shaping models which are selected by the shaping model extraction unit 203 and which satisfy the predetermined condition are arranged close to each other. By this, a use amount of shaping material to be used for shaping of additive models described below is reduced, and in addition, extraction of a shaping object is facilitated.

The shaping model extraction unit 203 associates the plurality of shaping models which satisfy the predetermined condition and which are included in the shaping data with each other so as to form one group. The shaping model extraction unit 203 may perform the association (assigning of a link) with reference to attributes included in the shaping data of the shaping models. The shaping model extraction unit 203 generates group information 23 indicating groups to which the individual shaping models belong. The different groups satisfy different conditions.

A link model addition unit 204 adds a link model which associates the plurality of shaping models which belong to a certain group with each other to shaping data 22 for each group generated by the shaping model extraction unit 203. The link model addition unit 204 adds shaping data of the link model to the shaping data of the plurality of shaping models which are associated with each other. Then the link model addition unit 204 outputs the link-assigned shaping data 24 which has been subjected to the process of adding the link model which associates the plurality of shaping models with each other to the shaping data 22. Accordingly, the link model addition unit 204 may be referred to as an output unit which outputs the shaping data 24 which has been processed as described above. Although the configuration in which the link-assigned shaping data 24 which has been subjected to the process of adding the link model performed by the link model addition unit 204 is output to a slice data generation unit 206 is illustrated in FIG. 2, the present invention is not limited to this. The shaping data 22 sliced by the slice data generation unit 206 may be transmitted to the link model addition unit 204 where the process of adding the link model is performed so as to generate the processed shaping data 24. Note that a shaping model which is not included in any group is transmitted to the slice data generation unit 206 without being processed.

The process of adding a link model performed by the link model addition unit 204 will be described in detail hereinafter.

A support body generation unit 205 receives the link-assigned shaping data 24 or the shaping data 22, generates data of a support body required when the shaping unit 21 shapes the plurality of shaping models included in the shaping data and the link model, and adds the data to the shaping data. Note that a support body may not be required depending on a shape or an orientation of a shaping model included in shaping data.

The slice data generation unit 206 generates slice data using the shaping data including the support body added thereto where appropriate by the support body generation unit 205. The slice data is generated by slicing the shaping data at a predetermined interval in a lamination direction and includes information on arrangement of the shaping materials in individual layers. In a case where the shaping model includes information, such as color information or material information, generated slice data includes information on types of materials to be used for the shaping and information on arrangement of the materials.

Note that the process of adding a link model, the slice process, and the process of assigning a support body may not be performed by the link model addition unit 204, the slice data generation unit 206, and the support body generation unit 205, respectively, in this order, and the order may be appropriately changed.

The slice data generation unit 206 may generate slice data in accordance with a type of the shaping unit 21. For example, if the shaping unit 21 forms a material layer one by one and laminates the generated material layers, generated slice data may be image data. Alternatively, if the shaping unit 21 arranges a shaping material along a predetermined path by a fused deposition modeling (FDM) or the like, generated slice data may be tool path data.

The shaping unit 21 receives the slice data generated by the slice data generation unit 206 and forms a solid object by the laminate shaping method based on the slice data. The method for forming a solid object employed in the shaping unit 21 is not particularly limited as long as a solid object is formed by the laminate shaping method. The shaping unit 21 may employ various methods including an optical shaping method, a powder sintering method (a laser sintering method), a powder fixing method, the FDM, an inkjet method, and electrophotography.

Flow of Shaping Process

Figure 3:
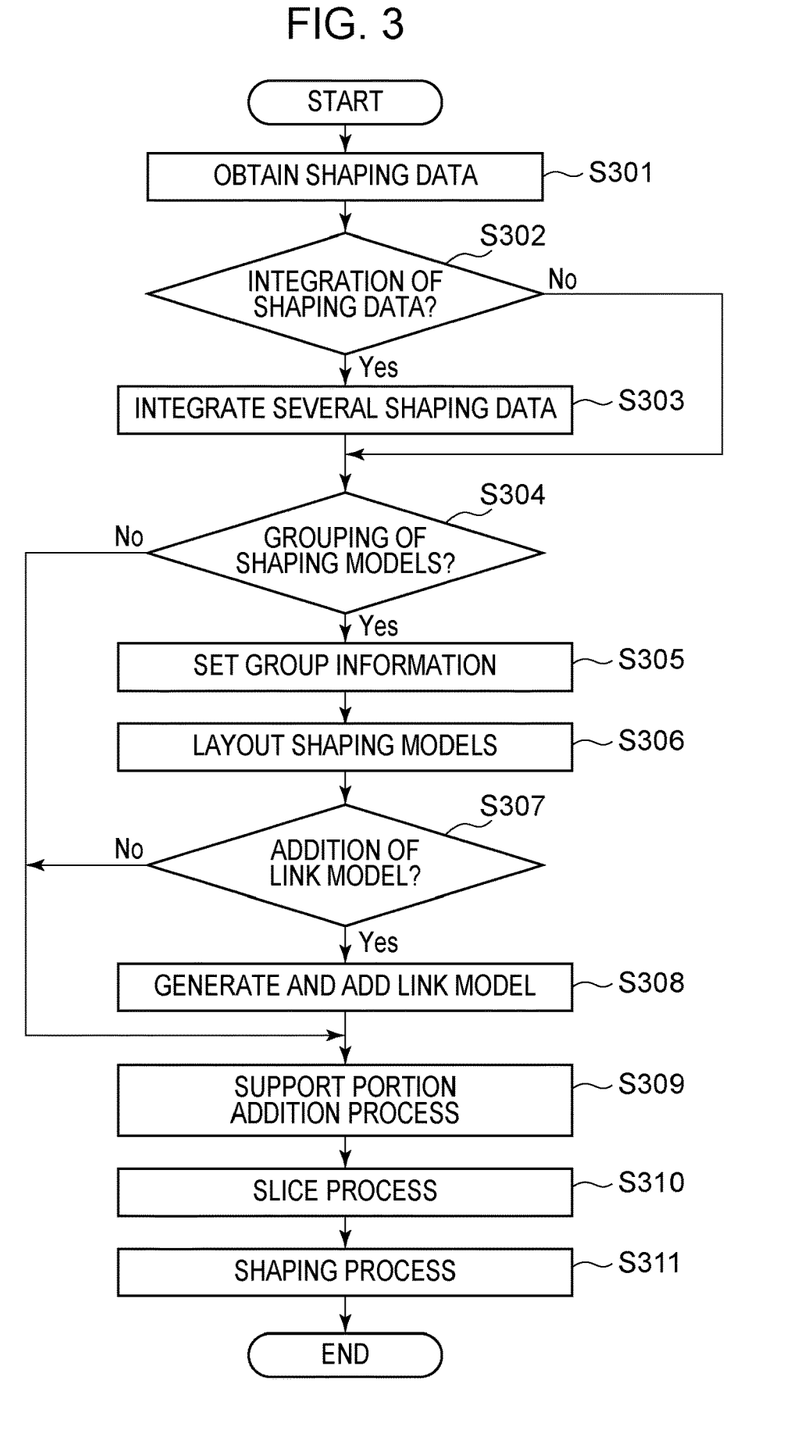
FIG. 3 is a flowchart of a process of shaping an object to be shaped including a link shaping object.

A flow of a shaping process will now be described with reference to FIG. 3. FIG. 3 is a flowchart of a process of shaping an object including a link shaping object.

In step S301, the shaping apparatus 101 stores shaping data 22 included in a shaping job received from an outside in the RAM. The shaping data 22 includes information (a shaping model) on a structure of a single shaping target object or structures of a plurality of shaping target objects. The shaping apparatus 101 may store a plurality of shaping data 22 by receiving a plurality of shaping jobs and storing shaping data 22 included in the individual shaping jobs in the RAM. Furthermore, the shaping apparatus 101 may store shaping jobs in the RAM, generate a job queue (a job list) in which the stored shaping jobs are aligned in order of reception, and successively process the shaping jobs by a first-in first-out (FIFO) method. Furthermore, the processing unit 20 may perform a process of changing the order of the shaping jobs in the job queue in accordance with a rule specified by a user.

In step S302, the job integration unit 201 determines whether the shaping data 22 of the plurality of shaping models (or the plurality of shaping jobs) stored in the RAM is to be integrated. In this case, the job integration unit 201 may generate single integrated shaping data by integrating the plurality of shaping data 22 and determine whether the plurality of shaping models included in the integrated shaping data which are laid out are included in a shaping region (a shaping space). When the determination is affirmative, the plurality of shaping data 22 may be integrated. In this case, the integration may be performed if a period of time required for shaping the integrated shaping data 22 is shorter than that in a case where the individual shaping jobs are shaped.

When the plurality of shaping data 22 is to be integrated (Yes in step S302), the job integration unit 201 integrates the plurality of shaping data 22 so as to generate integrated shaping data in step S303. When the plurality of shaping data is not to be integrated (No in step S302), a process is skipped until step S304.

In step S304, the shaping model extraction unit 203 determines whether the plurality of shaping models included in the shaping data 22 or the integrated shaping data are to be associated with each other (grouping) based on a predetermined condition in accordance with a link setting between the shaping models set by the user. When the grouping is to be performed (Yes in step S304), a process in step S305 is performed, whereas when the grouping is not to be performed (No in step S304), the process is skipped until step S309 and a normal shaping process is performed.

Note that, although the shaping model extraction unit 203 determines whether a link is to be assigned in accordance with an input by a user, the present invention is not limited to this. When the shaping data obtained by the processing unit 20 includes a plurality of shaping models and includes information indicating whether the individual shaping models satisfy the predetermined condition (information which enables assigning of a link), the processing unit 20 may assign a link instead of a user input. A method of the grouping performed in step S304 and step S305 will be described hereinafter in detail.

Figure 4:
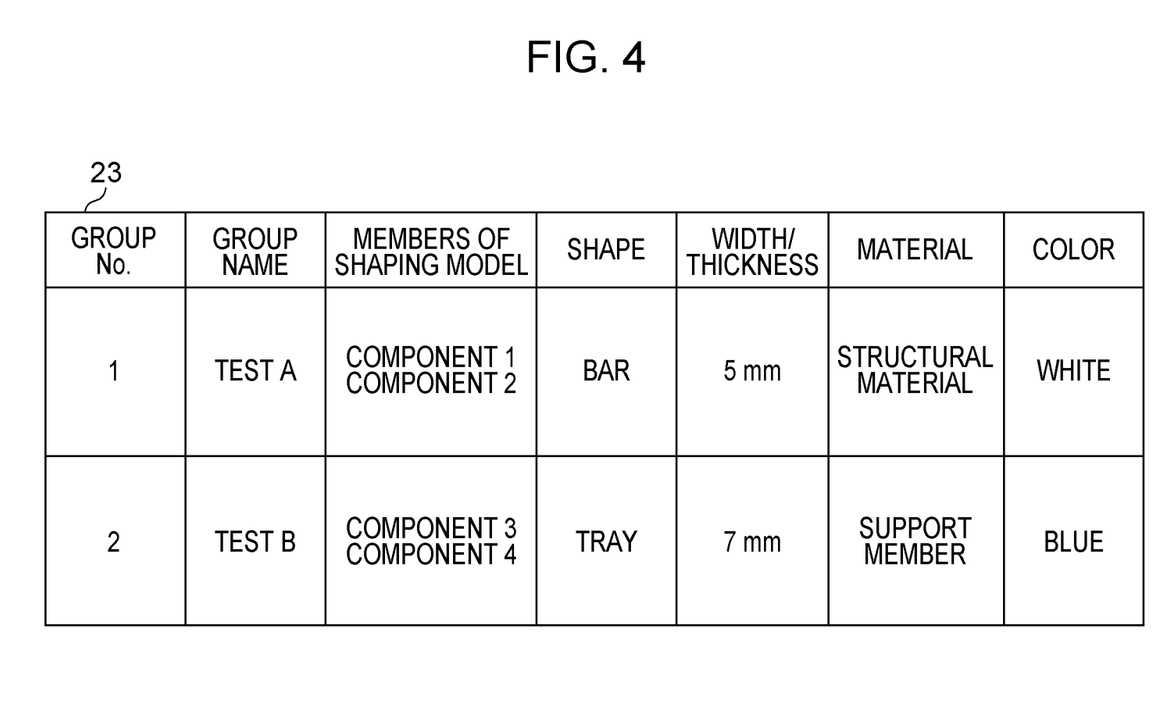
FIG. 4 is a diagram illustrating a data structure of group information.

In step S305, the shaping model extraction unit 203 extracts a number of the plurality of shaping models included in the shaping data 22 or the integrated shaping data which satisfy the predetermined condition and generates the group information 23. FIG. 4 is a diagram illustrating a data structure of the group information 23. The group information 23 includes association information for specifying a shaping model which satisfies a predetermined condition for each condition (for each group). The group information 23 includes a group name for specifying an extraction condition, a shaping model which belongs to a corresponding group, a type and a shape of a link model to be assigned, material and color information for shaping the link model, for example. The group information 23 may further include information indicating whether the link model which is data representing a structure of a link shaping object is to be imported from an outside. As this information, the user may select link information to be assigned to the shaping models included in the individual groups, for example, from among options included in the apparatus when the shaping model extraction unit 203 receives the link setting performed by the user.

In step S306, the layout generation unit 202 adjusts directions and arrangement of the plurality of shaping models included in the shaping data 22 or the integrated shaping data so as to generate layout. Here, the layout generation unit 202 generates layout in accordance with the group information 23. The layout generation unit 202 preferably adjusts the directions and the arrangement of the shaping models such that distances among the shaping models which are extracted and associated with each other by the shaping model extraction unit 203 become small. By this, a space including the plurality of shaping models which satisfy the predetermined condition (which are included in the same group) may become compact. As a result, sizes of link shaping objects which associate with the shaping models included in the same group may be reduced, and an amount of shaping material to be used may be reduced.

A case where a first link model which associates shaping models included in a first group extracted under a first condition and a second link model which associates shaping models extracted under a second condition are added will be described as an example of the generation of layout of the shaping models. In this case, the layout generation unit 202 preferably generates layout such that the first link model and the second link model do not overlap with each other. In this case, the generation of layout may be performed after or before the link models are added.

In step S307, the link model addition unit 204 determines whether a link model is to be added to the shaping data 22 or the integrated shaping data. When a link model is to be added (Yes in step S307), a process in step S308 is performed, whereas when a link model is not to be added (No in step S307), the process is skipped until step S309 and the normal shaping process is performed. Note that, if a setting in which a link model is added when the determination is affirmative in step S304 is made, the process in step S307 may be omitted.

In step S308, the link model addition unit 204 generates a link model based on information on characteristics of the link shaping object included in the group information 23. Then the link model addition unit 204 adds the generated link model to the shaping data 22 (or the integrated shaping data) so as to generate the link-assigned shaping data 24. In the generation of the link-assigned shaping data 24, a link model is generated in a data format of the shaping data 22, the link model is combined with the shaping data 22, and resultant single link-assigned shaping data 24 may be stored in a recording region. Alternatively, in a case where a link model may not be added depending on layout of the shaping model group, a notification for a determination as to whether layout is to be regenerated using the layout generation unit 202 which is to be made may be transmitted to the user.

The link model is data associated with a three-dimensional shape of a link shaping object which is shaped simultaneously with a shaping target object. A single link shaping object associates a plurality of shaping target objects with each other and may have various forms. For example, the shaping is performed in a state in which a plurality of shaping target objects are linked by a link shaping object of a bar shape or a frame shape. In this way, since the shaping is performed in the state in which shaping target objects are linked by a link shaping object, the plurality of shaping target objects which satisfy the predetermined condition may be integrally shaped. As a result, when objects which satisfy the predetermined condition are picked up by the worker from shaped objects after the shaping is completed, solid objects may not be checked one by one, and accordingly, the operation may be efficiently performed. Furthermore, the integral shaping is efficient for the pickup after the shaping, and in addition, the solid objects are not dispersed before the solid objects are delivered to a client of the shaping job. Furthermore, the solid objects are not broken due to contact or collision between the solid objects while the shaped solid objects are delivered to the client of the shaping job.

As another embodiment, a link shaping object of a tag shape is employed, for example. Specifically, in addition to the shaping target objects, a shaping object of a tag shape which enables recognition of link information associated with the shaping target objects by one sight is shaped. The link model addition unit 204 arranges the same link model or a link model in which association is recognized in the vicinity of the shaping models which have the same link name or in contact with the link models. Then the layout generation unit 202 determines layout while the shaping models and the corresponding link model are integrated. Hereinafter, the link model in this embodiment is referred to as a tag model where appropriate.

The worker may extract a plurality of shaping objects which are associated with each other only by checking a shaped tag and may efficiently perform an operation of extracting shaping objects which satisfy the predetermined condition. The tag model indicates link information by a shape, a color, or a mark. Furthermore, the tag models may be arranged in the vicinity of the shaping objects or may be added to the shaping objects by a method in which the tag models are easily removed after the shaping. Examples of the method in which the removal after the shaping is easily performed include a method for reducing an attachment area by linking a tag model and shaping objects by a bar or the like and a method for attaching the tag model to the shaping objects through a material which is dissolved in solvent which does not affect the shaping objects.

Furthermore, as another embodiment of the link shaping object, a link model (hereinafter referred to as a mark model) for forming a mark which is used for identifying a condition of extraction may be attached to a surface of the shaping model. The mark model may be a protruded mark or a recessed mark formed on a surface of a shaping target object. When a protruded mark model is to be added, the link model addition unit 204 generates or imports a mark model of a predetermined shape and assigns the mark model to the shaping data 22 such that the mark model is attached to a surface of the shaping model. When a recessed mark model is to be added, the link model addition unit 204 generates or imports a mark model of a predetermined shape and subtracts the mark model from the shaping model so as to add the mark model to shaping data. The mark model affects finish of a shaping object, and therefore, a portion where the mark model is added is preferably determined by a user's instruction.

Here, an example of a shape of a link model will be described with reference to FIGS. 5A to 5D. FIGS. 5A to 5D are diagrams schematically illustrating an example of shapes and arrangement of shaping models 501 and link models 502 included in the link-assigned shaping data 24.

Figure 5A:
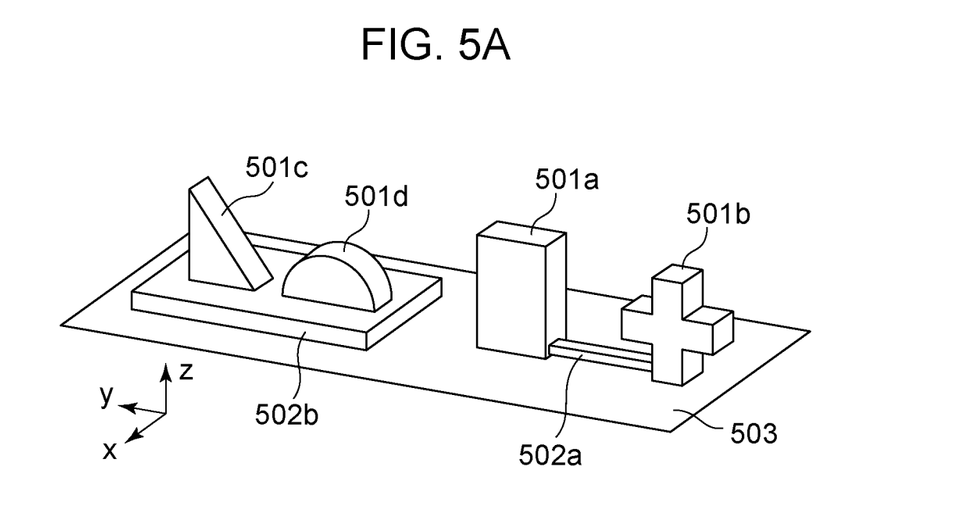
FIG. 5A is a diagram schematically illustrating an example of shapes and arrangement of shaping models and link models.

In FIG. 5A, a case where four shaping models 501a to 501d are included in shaping data will be described as an example. Here, the shaping models 501a and 501b in the four shaping models 501a to 501d are included in a first model group (a first group) extracted under the first condition. Furthermore, the shaping models 501c and 501d are included in a second model group (a second group) extracted under the second condition. Note that the number of shaping models, the number of groups, and shapes of the link models are merely examples and the present invention is not limited to these. Furthermore, in FIGS. 5B and 5C, only the shaping models 501a and 501b which belong to the first model group are illustrated.

In the link-assigned shaping data 24 of FIG. 5A, a link model 502a of a bar shape is added as a link model 502 which links the two shaping models (501a and 501b) which belong to the first model group. The link model addition unit 204 extracts information on a coordinate of a lower end surface of the shaping models (501a and 501b) to be linked when the link model 502a of the bar shape is added. Then the link model addition unit 204 calculates a line which connects the lower end surfaces of the shaping models 501a and 501b to each other and generates the link model 502a of the bar shape including the line. Although the shaping models of the link targets may be linked at any portion, the shaping models are preferably linked in lower ends of the shaping models of the link targets since a support body for the link models 502 is not required at a time of the shaping. Here, the line which connects the shaping models 501a and 501b to each other may be a straight line or a curved line, or a plurality of lines may be linked. The line preferably connects the two shaping models (501a and 501b) by a shortest distance.

The link-assigned shaping data 24 may be formed by adding the link models 502 to the shaping data 22 in the following procedure. For example, a cross-sectional shape and a size of the link model are stored as the group information 23. Then a distance between a center of gravity of a bottom surface of the shaping model 501a and a center of gravity of a bottom surface of the shaping model 501b is calculated, and the link models 502 of a length corresponding to the calculated distance in the cross-sectional shape of the link model which is stored are generated. Data is generated by integrating the shaping models 501a and 501b and the link models 502 using software for processing commercially-available three-dimensional data.

Alternatively, after a slice process is performed on a shaping data which has been laid out, slice data of the link models 502 may be added to resultant slice data. This case is different from the flow of FIG. 3. For example, a process of adding data of a line shape having a certain width which connects the center of gravity of the bottom surface of the shaping model 501a and the center of gravity of the bottom surface of the shaping model 501b to each other to slice data of a plurality of layers corresponding to a first layer of the shaping data to a layer which reaches a height of the link model. Since two-dimensional data is processed, the process of adding data of a link model may be easily performed.

Although a shape of the link model has basically a predetermined size, a portion of the link model may be corrected to have a smaller size so as not to be in contact with the shaping model. Furthermore, a width of a portion of the link model 502 which links to the shaping model 501 may be reduced so that the shaping model 501 and the link model 502 are easily separated from each other. In the case where a size different from a setting value is employed, a notification may be made for the user. Furthermore, in a case where a material which may be more easily removed when compared with a structural material is used for a support material, the portion of the link model 502 which links to the shaping model 501 may be formed by the support material. The shaping model 501 and the link model 502 may be easily separated from each other. Furthermore, the entire link model 502 may be formed by the support material.

Furthermore, in the link-assigned shaping data 24 of FIG. 5A, a link model 502b of a plate shape is added as the link model 502 which connects the two shaping models (501c and 501d) which belong to the second group. In a case where the link model 502b of the plate shape is to be added, the link model addition unit 204 generates the link model 502b of the plate shape having a region including entire lower end surfaces of the shaping models to be linked (501c and 501d) as an upper surface. Then the shaping models to be linked (501c and 501d) are arranged on the generated link model 502b of the plate shape. A layer of a low density may be formed between the link model 502b of the plate shape and the shaping models to be connected (501c and 501d) so that the link model 502b and the shaping models 501c and 501d are easily separated from each other, or the layer may be formed by the support material.

Figure 5B:
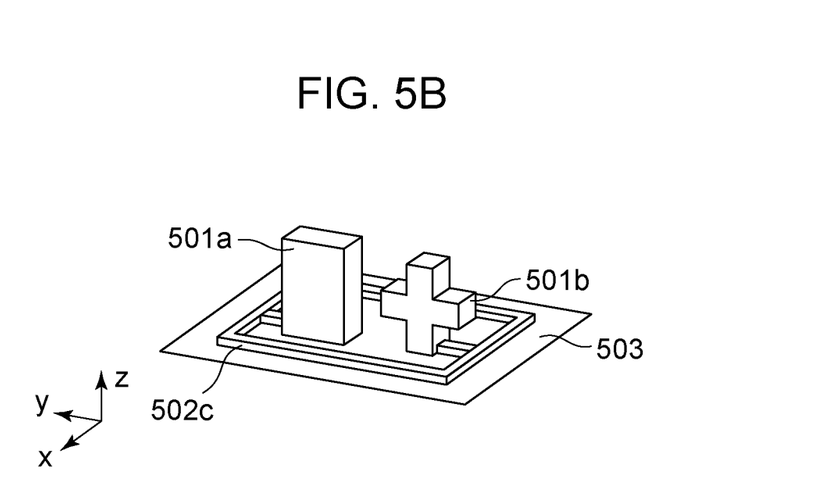
FIG. 5B is a diagram schematically illustrating an example of shapes and arrangement of shaping models and a link model.

In the link-assigned shaping data 24 of FIG. 5B, a link model 502c of a runner shape is added as the link model 502 which connects the two shaping models (501a and 501b) which belong to the first group. The link model 502c of the runner shape includes a frame which surrounds the shaping models to be linked (501a and 501b) and bars which connect the frame and the shaping models to be linked to each other.

Figure 5C:
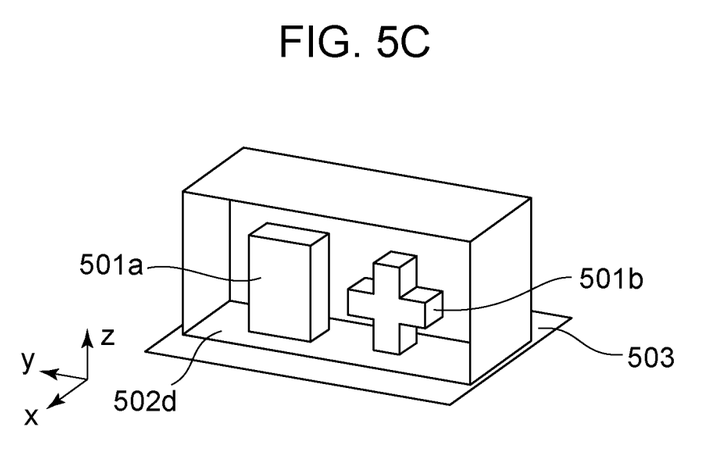
FIG. 5C is a diagram schematically illustrating an example of shapes and arrangement of shaping models and a link model.

In the link-assigned shaping data 24 of FIG. 5C, a link model 502d of a shape for covering the entire shaping model group to be linked is added as the link model 502 which connects the two shaping models (501a and 501b) which belong to the first group to each other. When the link model 502d of the shape for covering the entire shaping model group to be linked is to be added, the link model addition unit 204 detects a point group (six points) serving as a minimum value and a maximum value of a surface coordinate of the entire shaping model group in X, Y, and Z axes. Then a cuboid defined by six planes including the detected points is formed. The link model addition unit 204 adds the link model 502d by arranging a shaping material to a portion other than the shaping model group inside the cuboid. In this case, layout is determined such that shaping models of other groups are not included in the cuboid. Although the link model 502d is a cuboid in this embodiment, a shape of the link model 502d is not limited to this. Furthermore, a shape obtained by enlarging the cuboid described above by a margin may be employed. Alternatively, the link model 502d is not required to cover the entire model group to be linked and may have a shape in which the model group to be linked is partially exposed.

Figure 5D:
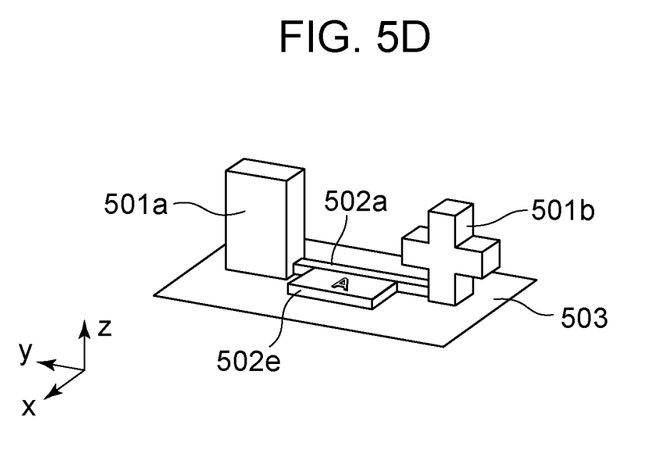
FIG. 5D is a diagram schematically illustrating an example of shapes and arrangement of shaping models and link models.

In the link-assigned shaping data 24 of FIG. 5D, a link model 502a of a bar shape is added, similarly to FIG. 5A, as the link model 502 which connects the two shaping models (501a and 501b) which belong to the first group to each other. In FIG. 5D, a tag model 502e is further added to the link model 502a of the bar shape. The tag model 502e has a mark of text of a group name added thereto. By this, the group name of the shaping model group which is linked by the link models 502 may be identified. When the tag model 502e is to be added, the link model addition unit 204 reads a group name included in the group information 23 after adding the link model 502a of the bar shape and forms a model having a space which is enough for the mark. Thereafter, the text of the group name is imprinted as a recessed mark or a protruded mark on the model when the tag model 502e is added. Note that the group name added to the tag model 502e may be marked as a recessed mark or a protruded mark, or may be represented by a different type of a shaping material or represented in a different color of a shaping material. Furthermore, a parameter associated with a size of the mark may be included in the group information 23 to be set or referenced. Although a case where text of the group name is added to the link model 502 is illustrated in this embodiment, a sign or a graphic may be added to the link model 502 instead of the text. Specifically, in FIG. 5D, a group name to which a shaping model group linked by the link model 502 belongs may be easily identified by adding a group identifier used to identify the group to the link model 502. Although the link models 502 are grounded in the examples of FIGS. 5A to 5D, the present invention is not limited to this. For example, a shortest line segment which connects shaping models to be linked may be calculated and the link model 502 may be disposed in a position of the line segment. Furthermore, information on arrangement in an arbitrary position may be received from the user and the link model 502 may be disposed based on the arrangement information.

In step S309, the support body generation unit 205 calculates a position and an amount of a support body required when the shaping unit 21 shapes a plurality of shaping models included in shaping data and a group identification model so as to generate a support body model indicating a structure of the support body. Then the support body generation unit 205 adds the generated support body model to the shaping data 24. Note that, when the support body is not required, the process in step S309 may be skipped.

In step S310, the slice data generation unit 206 generates slice data from the shaping data 24 to which the support body model is added in step S309.

In step S311, the shaping unit 21 performs a shaping process based on the slice data generated in step S310.

Group Setting Method

Hereinafter, some examples of a grouping method in the flow of the process of shaping an object to be shaped including a link shaping object will be described. The grouping described herein corresponds to step S304 and step S305 in the flowchart of FIG. 3. Note that the examples described below may be appropriately combined.

First Example

Figure 6:
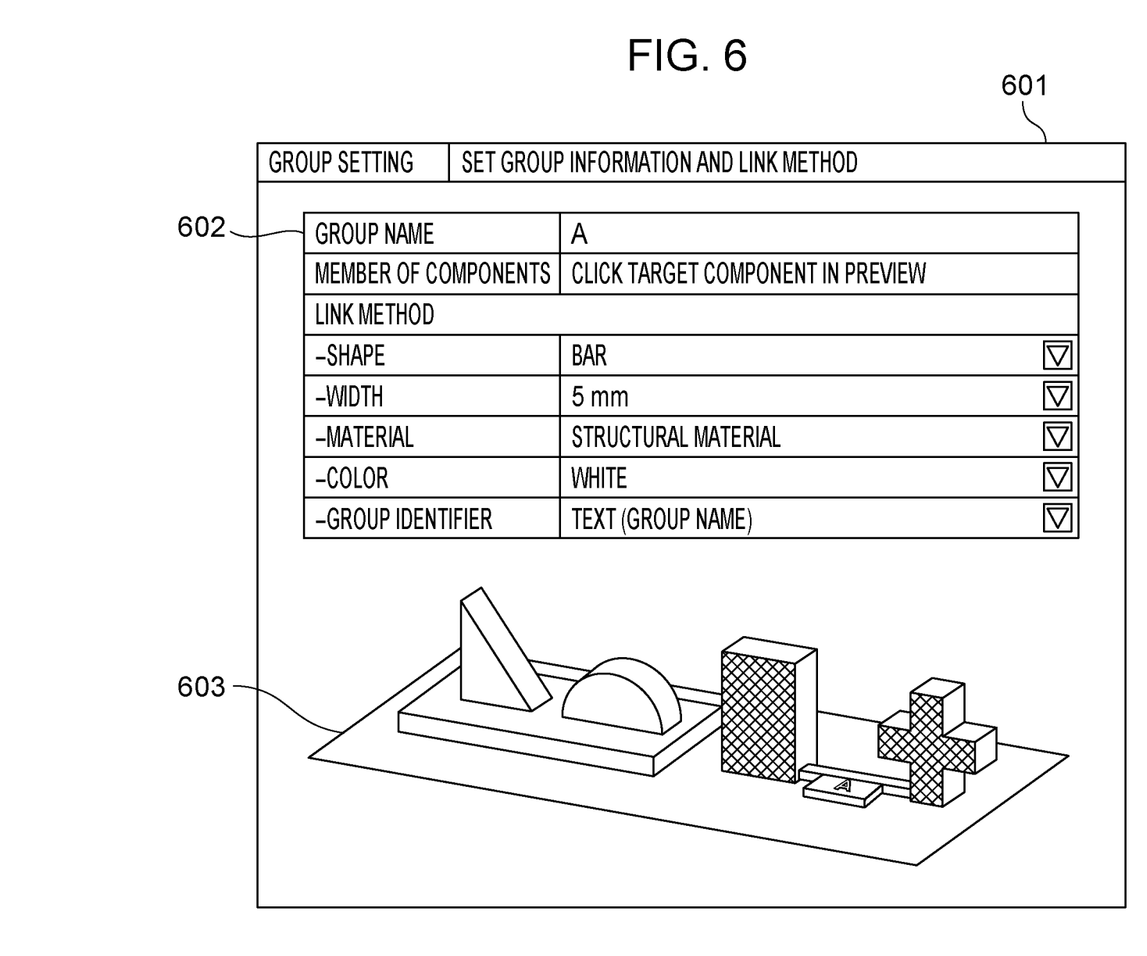
FIG. 6 is a diagram illustrating an example of a user interface.

In this embodiment, the shaping model extraction unit 203 receives an input of an extraction condition from the user and performs grouping based on the user's input. FIG. 6 is a diagram illustrating an example of a user interface used to perform the grouping base on a user's input.

A group setting screen 601 is displayed on an operation screen of the shaping apparatus 101 or the information processing apparatus 102. Here, a case where the shaping apparatus 101 includes the operation screen will be described. Note that the group setting screen 601 may be displayed only when a setting for enabling a link mode for performing the link process at a time of shaping is received in advance from the user. As an example of setting means which enables the link mode, an identifier which may determine whether the link mode has been enabled may be included in shaping instruction information in a shaping job and the identifier may be read and discriminated by the shaping model extraction unit 203. Furthermore, as the setting to the shaping apparatus 101, the setting information indicating the enabling of the link mode may be stored in the recording region in the shaping apparatus 101 and the shaping model extraction unit 203 may refer to the setting information of the link mode in the apparatus.

The group setting screen 601 includes a group information setting field 602 and a preview field 603. The shaping apparatus 101 receives a setting through a touch on the operation screen performed by the user or through an input device which is separately provided. Setting items include information on a group name, information on a shaping model which belongs to the group, and characteristics (a shape, thickness, a material, a color, and a group identifier) of a link shaping object.

As a method for specifying shaping models which belong to each group, the shaping apparatus 101 may detect a touch by the user on a shaping image of a shaping model displayed in the preview field 603, that is, a user's instruction may be employed. Then the shaping model corresponding to the target shaping image is set as a group target based on the user's instruction. By this, at least the single shaping model specified by the user may be set as a shaping model which belongs to a predetermined group.

The shaping model extraction unit 203 stores the information set by the user in the group setting screen 601 in the group information 23 for each group. In FIG. 6, shaping models corresponding to shaping images hatched in the preview field 603 are specified as the same group.

Note that a support material which is removed with comparative ease may be used as a shaping material used for shaping of a link model which may be specified by the group information 23 instead of a structural material. Since the support material is used as a shaping material for shaping a link model, a link shaping object may be removed with comparative ease.

Second Example

In this example, a plurality of shaping models included in integrated shaping data obtained by integrating a plurality of shaping data are grouped. The shaping model extraction unit 203 performs extraction and grouping of shaping models based on a shaping job to which the shaping data belongs before the integration.

The shaping model extraction unit 203 refers to identification information of the shaping job including shaping models to be shaped before the shaping data is integrated when performing extraction and grouping of the shaping models which satisfy a predetermined condition. Then the shaping model extraction unit 203 determines at least one of the shaping models included in the same shaping job as a single group. In this case, the shaping model extraction unit 203 may set unique text for each job, such as a job name of the shaping job, in contents of the text set for each group.

In this example, the job integration unit 201 generates integrated shaping data by integrating first shaping data including a first shaping model group including at least one shaping model and second shaping data including a second shaping model group including at least one shaping model. The shaping model extraction unit 203 performs grouping such that the shaping model included in the first shaping model group and the shaping model included in the second shaping model group belong to different groups.

Third Example

In this example, a plurality of shaping models included in integrated shaping data obtained by integrating a plurality of shaping data are grouped according to a job owner. The shaping model extraction unit 203 performs grouping based on owner information of a shaping job to which the shaping data before the integration belongs.

The shaping model extraction unit 203 refers to the owner information of a shaping job including shaping models to be shaped before the shaping data is integrated when performing the grouping. Then the shaping model extraction unit 203 determines at least one of the shaping models included in a shaping job of the same owner as a single group. In this case, the shaping model extraction unit 203 may set unique text for each owner, such as an owner's name of the shaping job in contents of the text set for each group. Here, the term "owner" means a person who has transmitted the shaping job. The owner of the shaping job and the user who operates the shaping apparatus 101 may be the same or different.

Fourth Example

In this example, a plurality of shaping models included in integrated shaping data obtained by integrating a plurality of shaping data is grouped. The shaping model extraction unit 203 performs grouping based on a data file including the shaping data before the integration.

The shaping model extraction unit 203 determines a group of data files which are shaping models as a single group when performing grouping. In this case, the shaping model extraction unit 203 may set unique text for each data file, such as a name of the data file including a shaping model, in contents of the text set for each group.

Fifth Example

In this example, single shaping data is copied and a plurality of shaping models included in integrated shaping data obtained by integrating a plurality of shaping data generated by the copy are grouped. In this example, the shaping model extraction unit 203 performs grouping based on the shaping data before the copy.

In this example, in step S301 in the flow of the shaping process in FIG. 3, the shaping apparatus 101 generates a number of copies of shaping data 22 included in a received shaping job corresponding to a prescribed number in response to a copy instruction issued by the user. Then the job integration unit 201 integrates the plurality of shaping data generated by the copy so as to generate integrated shaping data (S303).

The shaping model extraction unit 203 determines a model group copied from the same shaping data as a single group when performing the grouping. In this case, the shaping model extraction unit 203 may set unique text for each shaping data, such as a name of a data file including the copied shaping model, in contents of the text set for each group. Furthermore, the shaping model extraction unit 203 may further add sequential numbers unique to the copied data and add group identification models having different numbers for individual shaping models even in the same group.

Although the case where the shaping apparatus 101 copies the shaping data 22 or a shaping model included in the shaping data 22 is illustrated in this embodiment, the present invention is not limited to this. This example is applicable even in a case where a plurality of the same shaping models are included in the shaping data 22 received by the shaping apparatus 101. In this case, the shaping model extraction unit 203 performs grouping such that the plurality of the same shaping models included in the integrated shaping data are included in the same group after the integrated shaping data is generated.

As described above, according to the methods of the second to fifth examples, the grouping may be performed without a user's input.

Other Embodiments

The present invention may be realized by a process of supplying a program which realizes at least one of the functions of the foregoing embodiments to a system or an apparatus through a network or a computer readable storage medium and reading and executing the program by at least one processor included in a computer of the system or the apparatus. Furthermore, the present invention may be realized by a circuit (an application specific integrated circuit (ASIC), for example) which realizes at least one of the functions.

According to the present invention, improved efficiency of extraction of a plurality of solid objects which satisfy a predetermined condition from a plurality of shaped solid objects may be attained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A data processing apparatus comprising:
   a processor; and
   a memory coupled to the processor and having stored thereon instructions to be executed by the processor,
   wherein the processor and the memory cooperate to act as:
   a data obtaining unit configured to obtain shaping data including a plurality of shaping models;
   a condition obtaining unit configured to obtain a predetermined condition;
   a shaping model extraction unit configured to extract a shaping model that satisfies the predetermined condition from among the plurality of shaping models; and
   a processing unit configured to generate shaping data,
   wherein, in a case where there is a plurality of shaping models satisfying the predetermined condition, the processing unit adds shaping data of a link model that connects the plurality of shaping models satisfying the predetermined condition to each other without connection to a shaping model not satisfying the predetermined condition, and generates shaping data in shape that the plurality of shaping models satisfying the predetermined condition is connected to the link model and integrated,
   wherein the link model is a bar-shaped model, a runner-shaped model, or a plate-shaped model.

2. The data processing apparatus according to claim 1, wherein the plate-shaped model includes a tag model which has at least one member selected from the group consisting of a mark, a shape, a color, and a material which facilitates identification of the condition for the extraction of the plurality of shaping models.

3. The data processing apparatus according to claim 1, wherein the processor and the memory further cooperate to act as:
a layout generation unit configured to generate layout of the plurality of shaping models in the shaping data,
wherein the layout generation unit generates layout of the plurality of shaping models such that a distance between the extracted shaping models becomes small.

4. The data processing apparatus according to claim 1, wherein the condition obtaining unit receives an input by a user.

5. The data processing apparatus according to claim 1, wherein the processor and the memory further cooperate to act as:
an integration unit configured to generate single integrated shaping data by integrating a plurality of shaping data,
wherein the shaping model extraction unit extracts a plurality of shaping models included in the integrated shaping data based on information on the shaping data included before the shaping models are integrated by the integration unit.

6. The data processing apparatus according to claim 5, wherein the information on the shaping data corresponds to information on an owner of a shaping job including the shaping data.

7. The data processing apparatus according to claim 5, wherein the information on the shaping data corresponds to information on a data file including the shaping data.

8. The data processing apparatus according to claim 5, wherein, when the integrated shaping data includes a plurality of the same shaping models, the shaping model extraction unit extracts these shaping models as the same model group.

9. A non-transitory computer readable medium that stores a program that causes a computer to execute processing, comprising:
extracting a shaping model g that satisfies a predetermined condition from among a plurality of shaping models included in shaping data; and
in a case where there is a plurality of shaping models extracted by the extracting, adding shaping data of a link model that connects the plurality of shaping models satisfying the predetermined condition to each other without connection to a shaping model not satisfying the predetermined condition, and generating shaping data in shape that the plurality of shaping models satisfying the predetermined condition is connected to the link model and integrated,
wherein the link model is a bar-shaped model, a runner-shaped model, or a plate-shaped model.

10. The data processing apparatus according to claim 1, wherein the link model is connected to a shaping surface and is parallel to the shaping surface.

11. The storage medium according to claim 9, wherein the link model is connected to a shaping surface and is parallel to the shaping surface.

12. A method for manufacturing a three-dimensional object, comprising:
obtaining shaping data including a plurality of shaping models;
obtaining a predetermined condition;
extracting a shaping model that satisfies the predetermined condition from among the plurality of shaping models;
generating shaping data; and
performing shaping based on the shaping data,
wherein, in a case where a plurality of shaping models is extracted in the extracting, shaping data in shape that the plurality of shaping models satisfying the predetermined condition is not connected to a shaping model not satisfying the predetermined condition but is connected to the link model and integrated is generated, and, in the performing of the shaping, the shaping is performed based on the generated shaping data,
wherein the link model is a bar-shaped model, a runner-shaped model, or a plate-shaped model.

13. The method for manufacturing the three-dimensional object according to claim 12, wherein the link model is a connected to a shaping surface and is parallel to the shaping surface.

14. The data processing apparatus according to claim 1, wherein the processor decreases a thickness of a portion of the link model to be connected to the shaping model and generates the shaping data.

15. The data processing apparatus according to claim 9, wherein the processor decreases a thickness of a portion of the link model to be connected to the shaping model and generates the shaping data.

16. The method for manufacturing the three-dimensional object according to claim 12, wherein in the generating the shaping data, a thickness of a portion of the link model to be connected to the shaping model is decreased.

* * * * *